(12) United States Patent
Holmberg

(10) Patent No.: US 8,065,994 B2
(45) Date of Patent: Nov. 29, 2011

(54) ADAPTOR FOR DEVICE MOUNT

(76) Inventor: Larry Holmberg, Gully, MN (US)

( * ) Notice: Subject to any disclaimer, the term of this patent is extended or adjusted under 35 U.S.C. 154(b) by 20 days.

(21) Appl. No.: 12/592,878

(22) Filed: Dec. 4, 2009

(65) Prior Publication Data

US 2010/0126487 A1 May 27, 2010

Related U.S. Application Data

(63) Continuation of application No. 11/478,943, filed on Jun. 30, 2006, now Pat. No. 7,647,922.

(51) Int. Cl.
*F41B 5/00* (2006.01)
(52) U.S. Cl. .......................................... 124/86; 124/88
(58) Field of Classification Search .................. 124/86, 124/87, 88, 89; 33/265; 403/192, 196, 398, 403/399
See application file for complete search history.

(56) References Cited

U.S. PATENT DOCUMENTS

| | | | |
|---|---|---|---|
| 1,452,651 A | 4/1923 | Norrlin |
| 2,450,466 A | 10/1948 | Carlson |
| 2,576,007 A | 11/1951 | Fischer et al. |
| 2,814,118 A | 11/1957 | Evans et al. |
| 3,062,114 A | 11/1962 | Palos |
| 3,065,666 A | 11/1962 | Sampson |
| 3,427,102 A | 2/1969 | Wade |
| 3,483,623 A | 12/1969 | Kruzell |
| 3,545,356 A | 12/1970 | Nielsen |
| 3,737,232 A | 6/1973 | Millburn, Jr. |
| 3,782,822 A | 1/1974 | Spence |
| 3,834,052 A | 9/1974 | Steck, III |
| 3,986,285 A | 10/1976 | Krisay |
| 4,027,414 A | 6/1977 | Felix |
| 4,296,725 A | 10/1981 | Broderick |
| 4,309,095 A | 1/1982 | Buckley |
| 4,516,296 A | 5/1985 | Sherman |
| 4,561,204 A | 12/1985 | Binion |
| 4,786,204 A | 11/1988 | Mayeda |
| 4,835,621 A | 5/1989 | Black |
| 4,890,128 A | 12/1989 | Kania |
| 5,265,896 A | 11/1993 | Kravitz |
| 5,339,793 A | 8/1994 | Findley |
| 5,528,325 A | 6/1996 | Perez |
| 5,606,818 A | 3/1997 | Hardee |
| 5,687,910 A | 11/1997 | King |
| 5,887,375 A | 3/1999 | Watson |

(Continued)

FOREIGN PATENT DOCUMENTS

EP 1804017 A1 7/2007

(Continued)

OTHER PUBLICATIONS

Improved Construction Methods, "Laser Measuring System, Impulse LX", http://www.improvedconstructionmethods.com/impulse_xl.htm.

(Continued)

*Primary Examiner* — John Ricci
(74) *Attorney, Agent, or Firm* — Kinney & Lange, P.A.

(57) ABSTRACT

An adaptor for a device mount that is used to mount a device such as a video camera, rangefinder or a game caller is provided. In one embodiment, the adapter includes a threaded attaching portion and an engaging cylinder. The threaded screw portion is adapted to engage internal threads in a bore of a structure. The engaging cylinder is coupled to the threaded attaching portion. The surface of the engaging cylinder is adapted to engage a scope mount ring.

19 Claims, 3 Drawing Sheets

U.S. PATENT DOCUMENTS

| | | | |
|---|---|---|---|
| 6,070,355 | A | 6/2000 | Day |
| 6,192,614 | B1 | 2/2001 | Cliburn |
| 6,252,706 | B1 | 6/2001 | Kaladgew |
| 6,286,796 | B1 | 9/2001 | Pugliesi |
| 6,336,285 | B1 | 1/2002 | Baumer |
| 6,397,483 | B1 | 6/2002 | Perkins |
| 6,494,196 | B2 | 12/2002 | Harwath et al. |
| 6,556,245 | B1 | 4/2003 | Holmberg |
| 6,598,331 | B1 | 7/2003 | Thibodeaux |
| 6,623,182 | B2 | 9/2003 | Tatera |
| 6,678,988 | B1 | 1/2004 | Poff, Jr. |
| 6,681,755 | B2 | 1/2004 | Pujos |
| 6,722,076 | B2 | 4/2004 | Nielsen |
| 6,796,038 | B2 | 9/2004 | Humphries |
| 6,886,288 | B1 | 5/2005 | Yocum et al. |
| 6,932,305 | B2 | 8/2005 | Morales et al. |
| 7,188,978 | B2 | 3/2007 | Sharrah et al. |
| 7,390,130 | B2 | 6/2008 | Soulvie |
| 7,594,352 | B2 | 9/2009 | Holmberg |
| 7,614,805 | B2 | 11/2009 | Showalter |
| 2002/0078577 | A1 | 6/2002 | Aldred |
| 2002/0109057 | A1 | 8/2002 | Wooten et al. |
| 2004/0016169 | A1 | 1/2004 | Poff, Jr. |
| 2004/0257437 | A1 | 12/2004 | Lesseu |
| 2005/0268519 | A1 | 12/2005 | Pikielny |
| 2007/0031142 | A1 | 2/2007 | Moody et al. |
| 2007/0157502 | A1 | 7/2007 | Holmberg |
| 2007/0157503 | A1 | 7/2007 | Holmberg |
| 2008/0000463 | A1 | 1/2008 | Holmberg |

FOREIGN PATENT DOCUMENTS

| | | |
|---|---|---|
| GB | 2024558 A | 1/1980 |
| GB | 2114770 A | 8/1983 |
| WO | WO9012330 | 10/1990 |
| WO | WO2006090356 A1 | 8/2006 |
| WO | WO2006133029 A2 | 12/2006 |

OTHER PUBLICATIONS

"Specification Sheet on the Impulse 200 LR Laser (Rangefinder)," Nov. 15, 2003, Publisher: Laser Technology Inc.

ADAPTOR FOR DEVICE MOUNT

CROSS-REFERENCE TO RELATED APPLICATION(S)

This is a continuation of application Ser. No. 11/478,943, filed on Jun. 30, 2006.

BACKGROUND

For game hunters the ability to record the hunt in an efficient manner is desired. Moreover, the ability to attach other devices such as rangefinders and other electronic devices to the weapon in a manner that does not impede the hunt is also desired. For the reasons stated above and for other reasons stated below which will become apparent to those skilled in the art upon reading and understanding the present specification, there is a need in the art for a mount that can attach a device such an electronic device to a bow in an effective and un-intrusive manner.

SUMMARY

An embodiment of the present invention is an apparatus including a threaded attaching portion, an engaging cylinder, and a bow. The threaded attaching portion has a first threaded end and a second threaded opposite the first threaded end. The engaging cylinder has an internally threaded bore for receiving the first threaded end of the threaded attaching portion. The bow has an internally threaded counterweight bar insert for receiving the second threaded end of the threaded attaching portion. The threaded attaching portion attaches the engaging cylinder to the bow.

Another embodiment of the present invention is an apparatus including a double-sided screw, an adaptor for a device mount, and a bow. The double-sided screw has a first threaded end and a second threaded end opposite the first threaded end. The first threaded end and the second threaded end are similarly threaded and can be used interchangeably. The adaptor has an internally threaded bore receiving one of the first or second threaded ends. The bow has an internally threaded counterweight bar insert receiving one of the first or second threaded ends. The double-sided screw secures the adaptor to the bow.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
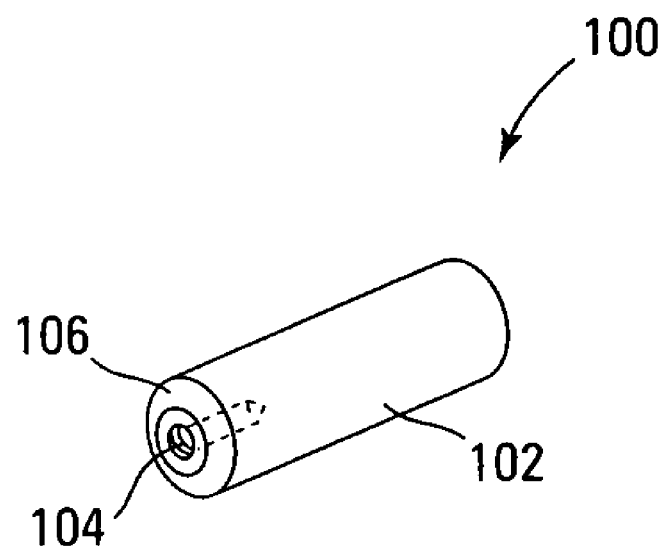
FIG. 1 is a side perspective view of an adaptor of one embodiment of the present invention.
Figure 2:
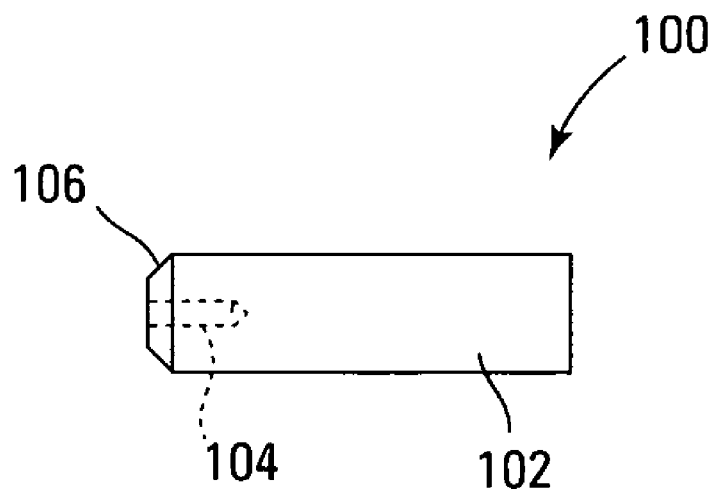
FIG. 2 is a side view of the adaptor of FIG. 1.

Embodiments of the present invention provide a bow adapter that is used in combination with a device mount to mount a device to a bow. The device being a device used for hunting such as a video camera, a rangefinder, a game caller and the like. Referring to FIG. 1, an adapter 100 of one embodiment of the present invention is provided. As illustrated, the bow adapter 100 includes an engaging cylinder 102, a tapered neck portion 106 and a threaded bore 104. A side view of an adaptor 100 is further illustrated in FIG. 2.

Figure 3:
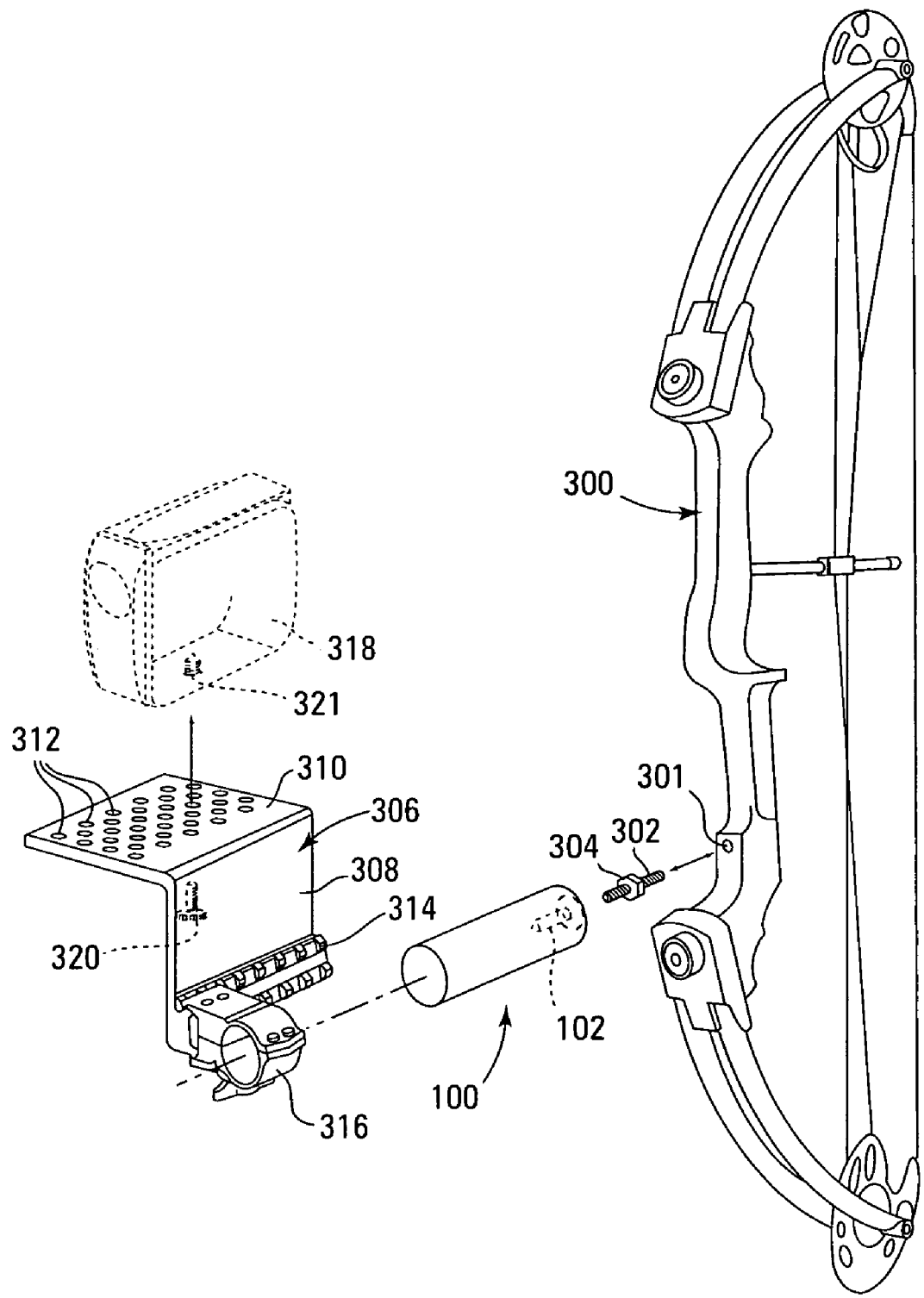
FIG. 3 is a side perspective view of the adaptor of FIG. 1 in use.

FIG. 3 is a side perspective view of the adaptor 100 of FIG. 1 in use. As illustrated, a threaded attaching portion 302 is received in bore 104 of the adaptor 100. The threaded attaching portion 302 is then threadably engaged with internal threads in bore 301 in a structure 300. The structure 300 illustrated in FIG. 3 is a bow 300. In particular, the bore 301 in this example, is a threaded counterweight bar insert 301 of the bow 300. A tightening nut 304 is used to secure the adapter 100 to the structure 300 once the threaded attaching portion 302 is threadably engaged with internal threads of the insert 310. In particular, the nut 304 is tightened to selectively abut a surface of the structure 300 about the bore 301.

A scope mount ring 316 is then attached around a surface of the engaging cylinder 102 as illustrated in FIG. 3. In particular a circular bracket of the scope mount ring 316 is secured around the surface of the engaging cylinder 102. In one embodiment, the scope mount ring 316 is a commercially available scope mount ring 316. The scope mount ring 316 is in turn coupled to a mounting rail 314 on a mount device 306 by placing the mounting rail 314 in a mounting track of the scope mount ring 316. As illustrated, the position of the scope mount ring 316 can vary along the mounting rail 314 such that the device mount 306 can be adjusted in position in relation to the structure 300. The device mount 306 includes a side plate or side portion 308. As illustrated the mounting rail 314 extends from the side plate 308. The device mount 306 further has a support plate or support portion 310 that extends from the side plate 308. The support plate 310 is designed so that a device can rest thereon. The support plate 310 is this embodiment includes a plurality of mounting apertures 312. A device 318 is mounted to the support plate 310 via a selected mounting aperture 312. In particular, a thumb screw 320 or other threaded device, is passed through the selected mounting aperture 312 and threadably engages an internally threaded bore 320 in the device 318 to mount the device 318 to the device mount 306. Providing a plurality of mounting apertures 312 allows for the adjustment in positioning of the device 306 on the mount as well as allows for different types of devices to be used.

In some embodiments, the device can be any device used in hunting such a video camera, rangefinder and the like. In one embodiment, the device is a game caller 318. In this embodiment, the game caller 318 has an internally threaded bore 321 in its housing. The internal threads are designed to engage external threads of the thumb screw 320 or other threaded device used to mount the game caller 318 to the device mount 306.

Figure 4:
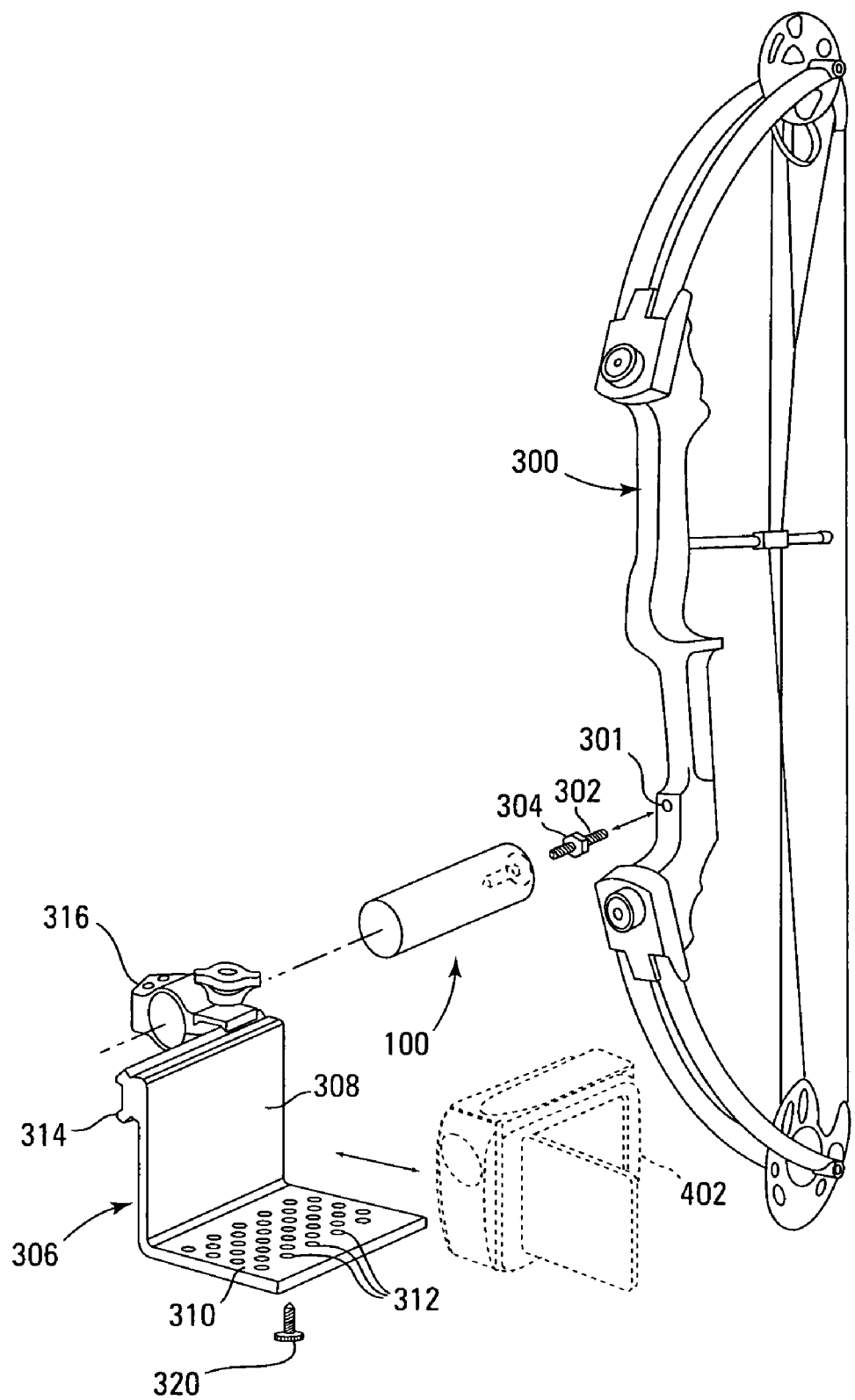
FIG. 4 is also a side perspective view of the adaptor of FIG. 1 in use.

FIG. 4 is another side perspective view of the adaptor 100 of FIG. 1 in use. FIG. 4 further illustrates that the position of the device mount 306 can change in relation to the adaptor 100 to adjust the position of the device 402 in relation to structure 300. In particular, in FIG. 4, the support plate 310 is positioned below the adaptor 100, while in FIG. 3, the support plate 310 is positioned above the adaptor 100. Although, the device illustrated in FIG. 4, is a video camera 402, any other type of device with an internally threaded bore could be used.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus comprising:
a threaded attaching portion having a first threaded end and a second threaded end opposite the first threaded end;
an engaging cylinder having an internally threaded bore for receiving the first threaded end of the threaded attaching portion;
a bow having an internally threaded counterweight bar insert for receiving the second threaded end of the threaded attaching portion; and
an electronic device connected to the engaging cylinder, wherein the threaded attaching portion attaches the engaging cylinder and the connected electronic device to the bow.

2. The apparatus of claim 1, further comprising:
a nut centrally located on the threaded attaching portion between the first threaded end and the second threaded end, the nut having a first side for abutting a surface of the engaging cylinder around the internally threaded bore and a second side for abutting a surface of the bow around the internally threaded counterweight bar insert.

3. The apparatus of claim 1, wherein the first threaded end and the second threaded end are similarly threaded such that the second threaded end can be received by the internally threaded bore of the engaging cylinder and the first threaded end can be received by the internally threaded counterweight bar insert of the bow.

4. The apparatus of claim 1, wherein the engaging cylinder includes a tapered neck portion surrounding the internally threaded bore.

5. The apparatus of claim 1, further comprising:
a scope mount ring attachable to the engaging cylinder.

6. The apparatus of claim 5, wherein a first side of the scope mount ring surrounds the engaging cylinder, thereby attaching the scope mount ring to the bow.

7. The apparatus of claim 6, further comprising:
a device mount attachable to the scope mount ring.

8. The apparatus of claim 7, wherein a second side of the scope mount ring clamps onto a mounting rail of the device mount, thereby attaching the device mount to the bow.

9. The apparatus of claim 1, wherein the electronic device is at least one of a camera, a rangefinder, and a game caller.

10. An apparatus comprising:
a double-sided screw having a first threaded end and a second threaded end opposite the first threaded end;
an adaptor for mounting an electronic device, the adaptor having an internally threaded bore receiving one of the first or second threaded ends;
a bow having an internally threaded counterweight bar insert receiving one of the first or second threaded ends; and
an electronic device connected to the adaptor, wherein the double-sided screw secures the adaptor and the connected electronic device to the bow.

11. The apparatus of claim 10, wherein the adaptor is cylindrical and includes a tapered neck portion surrounding the internally threaded bore.

12. The apparatus of claim 10, further comprising:
a device mount connected to the adaptor.

13. The apparatus of claim 12, wherein a scope mount ring attaches the device mount to the adaptor.

14. The apparatus of claim 12, wherein a first side of the scope mount ring surrounds the adaptor and a second side of the scope mount ring clamps onto the device mount.

15. The apparatus of claim 10, wherein the electronic device is a rangefinder.

16. The apparatus of claim 10, wherein the electronic device is a game caller.

17. The apparatus of claim 10, wherein the electronic device is a camera.

18. The apparatus of claim 10, wherein the electronic device is a video camera.

19. An apparatus comprising:
a threaded attaching portion having a first threaded end and a second threaded end opposite the first threaded end;
an engaging cylinder having an internally threaded bore for receiving the first threaded end of the threaded attaching portion;
a scope mount ring attachable to the engaging cylinder; and
a bow having an internally threaded counterweight bar insert for receiving the second threaded end of the threaded attaching portion, wherein the threaded attaching portion attaches the engaging cylinder to the bow.

* * * * *